W. BIRKBECK & W. H. ASHMAN.
VALVE.
APPLICATION FILED SEPT. 22, 1914.
1,138,531.
Patented May 4, 1915.
2 SHEETS—SHEET 1.
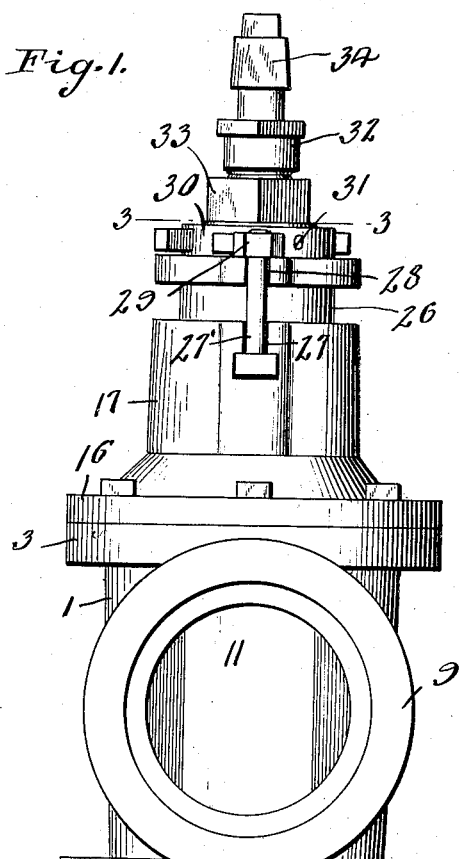
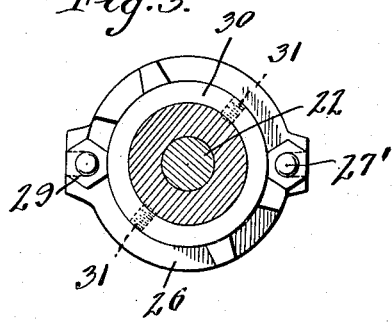
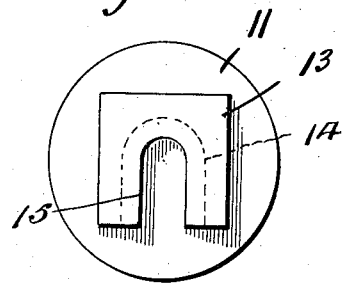
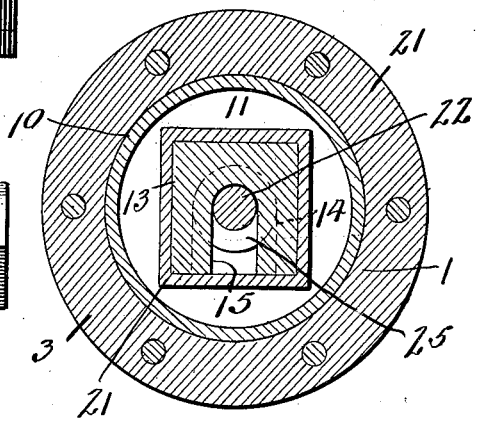
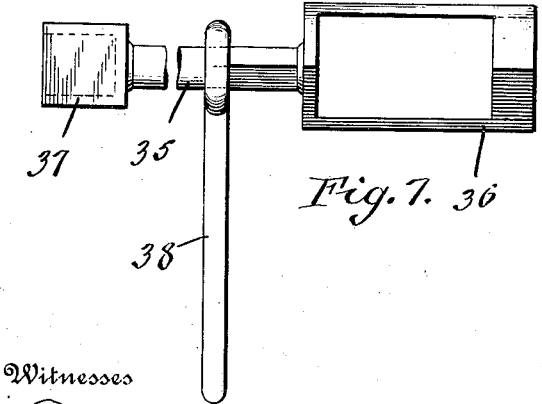
Witnesses
Inventors
W. Birkbeck and
W. H. Ashman,
By Victor J. Evans
Attorney

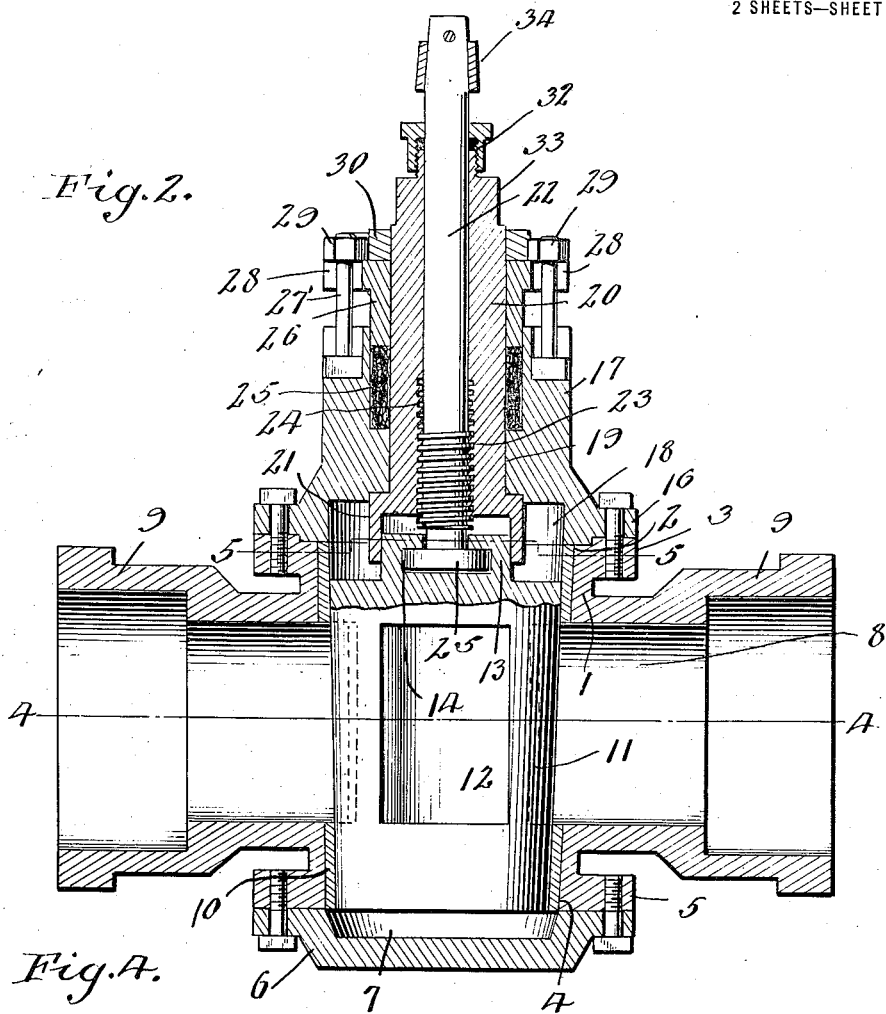
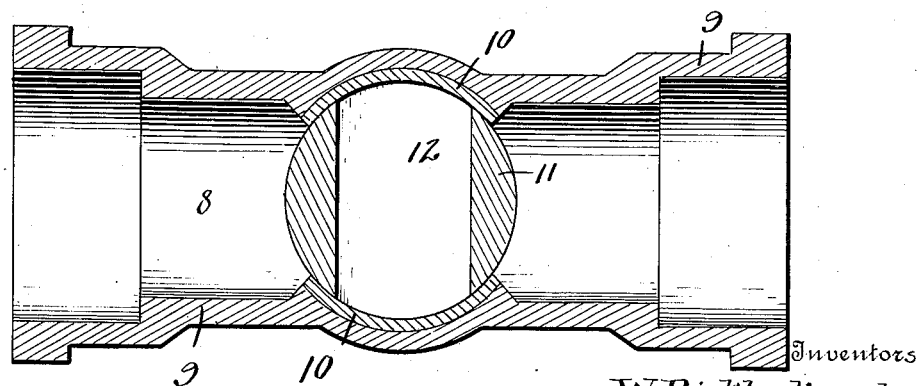

UNITED STATES PATENT OFFICE.

WILLIAM BIRKBECK AND WILLIAM H. ASHMAN, OF FREELAND, PENNSYLVANIA.

VALVE.

1,138,531.      Specification of Letters Patent.      Patented May 4, 1915.

Application filed September 22, 1914. Serial No. 862,993.

*To all whom it may concern:*

Be it known that we, WILLIAM BIRKBECK and WILLIAM H. ASHMAN, citizens of the United States, residing at Freeland, in the county of Luzerne and State of Pennsylvania, have invented new and useful Improvements in Valves, of which the following is a specification.

This invention relates to improvements in valves and has particular application to a rotary valve.

In carrying out the present invention, it is our purpose to provide a rotary valve which may be actuated to open and closed positions with ease and facility and which may be locked in one position or the other.

It is also our purpose to provide a rotary plug valve wherein the plug may be rotated to open and closed positions and wherein the frictional contact between the plug and its seat may be increased and decreased to hold the plug against turning movement and release the same.

Furthermore, we aim to provide a valve of the class described which will embrace the desired features of simplicity, efficiency and durability, which will operate efficiently and effectively under all conditions and which may be manufactured and maintained at a minimum expense.

A still further object of the invention is to provide a valve of the type set forth wherein the component parts may be readily disassembled in order that the valve may be cleaned and repaired and wherein the component parts, when assembled, will be fluid tight so that leakage through the valve is eliminated.

With the above and other objects in view, the invention consists in the construction, combination and arrangement of parts hereinafter set forth in and falling within the scope of the claims.

In the accompanying drawings; Figure 1 is a view in end elevation of a valve constructed in accordance with our present invention. Fig. 2 is a longitudinal sectional view through the valve. Fig. 3 is a horizontal sectional view on the line 3—3 of Fig. 1. Fig. 4 is a horizontal sectional view on the line 4—4 of Fig. 2. Fig. 5 is a horizontal sectional view on the line 5—5 of Fig. 2. Fig. 6 is a top plan view of the turn plug. Fig. 7 is a view in side elevation of the key.

Referring now to the drawings in detail, 1 designates a cylindrical casing having an open end 2 formed with an outwardly projecting circumferential flange 3 and an open end 4 formed with an outwardly projecting circumferential flange 5 and bolted to the flange 5 and closing the end 4 of the valve casing is a cap plate 6 formed, contiguous the bore of the casing, with a depression 7. The casing 1 is formed with a transverse fluid passage 8 and formed integral with the casing at diametrically opposite points concentrically of the fluid passage therein and projecting outwardly therefrom are coupling collars 9, 9.

In the present instance, the bore of the casing tapers downwardly and is provided with a lining 10 of lead or analogous metal and rotatably mounted within such bore is a turn plug 11 formed with a transverse bore 12 adapted, when the plug is rotated in one direction, to aline with the fluid passage 8 in the casing so that the fluid within the conduit controlled by the valve may flow therethrough. The side wall of the plug 11 tapers downwardly owing to the downward taper of the wall of the bore in the casing so that the plug will effectively engage the seat. Formed on the upper end of the plug 11, that is the end of the plug within the open end 2 of the casing, is a substantially rectangular block 13 formed with a substantially U-shaped recess 14 opening onto one end thereof and having the upper wall provided with a slot 15 having an open end contiguous the open end of the recess. Seated upon the flange 3 at the open end 2 of the casing and bolted or otherwise connected thereto is an outwardly extending circumferential flange 16 formed on the lower end of a hood or bonnet 17. The under surface of the hood or bonnet contiguous the open end 2 of the casing 1 is formed with a depression 18 surrounding the block 13 and with a vertical bore 19 contiguous the depression and coaxial with the bore of the casing. Rotatably mounted within the bore 19 is a sleeve 20 having the lower end thereof equipped with a socket member 21 of a configuration corresponding to that of the block 13 and inclosing the latter, the socket member and block forming a rigid connection between the valve plug and the sleeve 20 whereby the plug may be rotated to open and closed positions through the medium of the sleeve. Mounted within the sleeve 20 and capable of rotation therein is a stem 22 having the lower portion thereof threaded as at 23 and engaging the threaded inner wall 24 of the sleeve. The lower end of the stem 22 passes through the slot 15 and is equipped with a head 25 disposed within the recess 14 in the block. When the stem 22 is rotated in one direction, the latter moves within the sleeve 20, incident to the threaded connection between the stem and sleeve, and in the upward movement of the stem the valve plug 11 is elevated slightly so that the side wall of the plug is lifted out of frictional engagement with the seat. The valve may now be rotated to open or closed position through the medium of the sleeve 20. On the other hand, when the stem is rotated in the reverse direction, the valve plug is lowered and so binds against the seat thereby locking the valve against turning movement under the action of the sleeve. The bore 19 in the hood 17 at the upper end of the latter is enlarged circumferentially and disposed within the enlarged portion of the bore and encircling the sleeve 20 is a packing 25', while encircling the stem and disposed within the enlarged portion of the bore 19 is a packing gland 26 acting to maintain a fluid tight joint between the hood or bonnet and the sleeve.

In the present instance, the outer wall of the bonnet, is formed with inverted T-shaped slots 27 and disposed within such slots and extending upwardly therefrom are headed bolts 27' and the shanks of the bolts lie within recesses 28, 28 formed in the flange of the gland 26 at diametrically opposite points, nuts 29 being threaded onto the upper extremities of the bolts and coacting with the latter to hold the gland 26 within the enlarged portion of the bore 19 in the hood. Thus, the gland may be moved into the bore in the hood to take up any wear between the parts.

Surrounding the sleeve 20 above the gland is a locking collar 30 adapted to bear upon the upper end of the gland and coacting with the bolts 27' to maintain the gland in adjusted position, and acting upon the nuts 29 on the upper ends of the bolts to lock such nuts against movement, set screws 31 being carried by the collar and bearing against the adjacent wall of the sleeve to hold the collar against movement thereon. Surrounding the stem 22 at the upper end of the sleeve 20 is a packing gland 32. In this embodiment of our invention, the upper end of the sleeve 20, that is the portion projecting above the locking collar 30 is polygonal in cross section as at 33, while encircling the upper extremity of the stem 22 and secured thereto is a polygonal nut 34. In order that the stem 22 may be rotated to lock and unlock the valve and the sleeve revolved to open and close the valve, we employ a key comprising a shank 35 equipped at one end with a large socket 36 adapted to fit over the upper end of the stem 22, the packing gland 32 and engage the polygonal end 33 of the sleeve, and at its opposite end with a relatively small socket 37 designed to fit over the polygonal nut 34. Secured to the shank 35 and extending outwardly therefrom at right angles thereto is an operating handle 38 whereby the shank may be rotated when applied.

From the foregoing description taken in connection with the accompanying drawings, the construction, mode of operation and manner of employing our improved valve will be readily apparent. Assuming the valve plug to be locked in closed position and it is desired to open the valve, the socket 37 is applied to the polygonal nut 34 on the upper end of the stem 22 and the handle 38 actuated to rotate the shank 35 and the stem 22. In the rotation of the stem 22 the latter is elevated and so elevates the plug 11, the block 13 moving upwardly within the socket member 21 in the upward movement of the valve. As the valve plug is elevated the side wall thereof disengages the seat or wall of the bore in the casing 1. The socket 36 on the opposite end of the shank 35 is now passed over the nut 34 and packing gland 32 and engages the polygonal end 33 of the sleeve. The handle 38 is now actuated to revolve the shank 35 and sleeve whereby the valve plug is revolved within the casing to bring the port 12 into registration with the fluid passage 8 in the casing. To lock the valve plug in open position the socket 37 is again applied to the nut 34 and the stem 22 rotated under the action of the key to lower the valve plug whereby the side wall of the latter frictionally engages the seat and so locks the valve in open position.

It will be seen that we have provided a fluid controlling valve wherein the valve plug may be readily rotated to open and closed positions and locked in one or the other positions and wherein the component parts may be readily taken apart when it is desired to repair the valve structure or clean the same.

While we have herein shown and described one preferred form of our invention by way of illustration, we wish it to be understood that we do not limit or confine ourselves to the precise details of construction herein described and delineated, as modification and variation may be made within the scope of the claims without departing from the spirit of the invention.

We claim:

1. In a valve, a casing having a fluid passage therethrough and a valve seat formed therein, a plug engaging said seat controlling said passage and rotatable to open and closed positions, a non-circular block on one end of said plug formed with a substantially U-shaped recess opening onto one end of the block and having the upper wall provided with a slot having an open end contiguous to the open end of the recess, a sleeve projecting out of said casing coaxial with said plug, a socket on the inner end of said sleeve surrounding said block and of a shape corresponding to that of the block whereby in the rotation of the sleeve, the plug will be actuated to open and closed positions, a stem disposed within said sleeve and having the inner end thereof passed through the slot in said block and extending into said recess, a head on the inner end of said stem within said recess, and means for moving said stem longitudinally within the sleeve to move the plug longitudinally to increase and decrease the frictional contact between the plug and seat.

2. In a valve, a casing having a fluid passage therethrough and a valve seat formed therein, a plug engaging said seat controlling said passage and rotatable to open and closed positions, a non-circular block on one end of said plug formed with a substantially U-shaped recess opening onto one end of the block and having the upper wall provided with a slot having an open end contiguous to the open end of the recess, a sleeve projecting out of said casing coaxial with said plug, a socket on the inner end of said sleeve surrounding said block and of a shape corresponding to that of the block whereby in the rotation of the sleeve, the plug will be actuated to open and closed positions, a stem disposed within said sleeve and having the inner end thereof passed through the slot in said block and extending into said recess, a head on the inner end of said stem within said recess, means for moving said stem longitudinally within the sleeve to move the plug longitudinally to increase and decrease the frictional contact between the plug and seat, and a key having socket members adapted to engage the outer ends of said sleeve and stem respectively whereby the sleeve and stem may be actuated.

In testimony whereof we affix our signatures in presence of two witnesses.

WILLIAM BIRKBECK.
    WILLIAM H. ASHMAN.

Witnesses:
    DANIEL S. BUCKLEY,
    CHAS. J. JACOBS.